(12) United States Patent
Faltyn et al.

(10) Patent No.: US 10,609,214 B2
(45) Date of Patent: *Mar. 31, 2020

(54) INTELLIGENT SUBSCRIBER PROFILE CONTROL AND MANAGEMENT

(71) Applicant: Broadsource Group Pty Ltd, Docklands (AU)

(72) Inventors: Haydn Faltyn, Melbourne (AU); Michael Gliana, Melbourne (AU)

(73) Assignee: BROADSOURCE GROUP PTY LTD., Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,572

(22) Filed: Jun. 10, 2016

(65) Prior Publication Data
US 2017/0118333 A1 Apr. 27, 2017

Related U.S. Application Data

(60) Provisional application No. 62/245,965, filed on Oct. 23, 2015.

(51) Int. Cl.
| | |
|---|---|
| *H04M 3/42* | (2006.01) |
| *H04M 1/725* | (2006.01) |
| *H04W 4/50* | (2018.01) |
| *H04W 4/16* | (2009.01) |

(52) U.S. Cl.
CPC ... *H04M 3/42323* (2013.01); *H04M 1/72563* (2013.01); *H04M 1/72569* (2013.01); *H04M 3/42238* (2013.01); *H04W 4/16* (2013.01); *H04W 4/50* (2018.02); *H04M 1/72566* (2013.01); *H04M 1/72572* (2013.01)

(58) Field of Classification Search
CPC ..... H04M 3/436; H04M 3/42059; H04M 3/54
USPC .......... 379/201.01–201.02, 210.02, 379/211.01–211.04
See application file for complete search history.

(56) References Cited

U.S. PATENT DOCUMENTS

| | | | |
|---|---|---|---|
| 7,813,822 B1 | 10/2010 | Hoffberg | |
| 8,126,439 B1 | 2/2012 | Sankaranaraynan et al. | |
| 2006/0052091 A1 | 3/2006 | Onyon et al. | |
| 2010/0281427 A1* | 11/2010 | Ghosh | G06F 21/6263 715/811 |
| 2011/0293084 A1* | 12/2011 | Bhagavatula | H04L 41/5067 379/211.02 |
| 2013/0013727 A1* | 1/2013 | Walker | H04W 4/003 709/217 |
| 2014/0235203 A1* | 8/2014 | Gonsalves | H04L 63/0823 455/410 |
| 2014/0302835 A1* | 10/2014 | Henderson | H04W 4/001 455/418 |
| 2014/0317680 A1 | 10/2014 | Kacherov et al. | |
| 2017/0090858 A1* | 3/2017 | Paris | G06F 3/165 |

* cited by examiner

*Primary Examiner* — Rasha S Al Aubaidi
(74) *Attorney, Agent, or Firm* — Galvin Patent Law LLC; Brian R. Galvin

(57) ABSTRACT

A system for dynamic profile and persona management, comprising a profile and persona management server that receives device event information from a user device, and compares the event information to a feature bundle, the feature bundle corresponding to a set of feature configurations, and directs the operation of a telephony control system based on the feature configurations. The system also comprises a database for storing feature configurations and feature bundles.

6 Claims, 9 Drawing Sheets

INTELLIGENT SUBSCRIBER PROFILE CONTROL AND MANAGEMENT

CROSS-REFERENCE TO RELATED APPLICATIONS

This application claims the benefit of, and priority to, U.S. provisional patent application Ser. No. 62/245,965, titled "INTELLIGENT SUBSCRIBER PROFILE CONTROL/MANAGEMENT" and filed on Oct. 23, 2015, the entire specification of which is incorporated herein by reference in its entirety.

BACKGROUND OF THE INVENTION

Field of the Art

The disclosure relates to the field of business communication, and more particularly to the field of managing call profiles and subscriber personas on, and related behavior of, a telephone control system or private branch exchange.

Discussion of the State of the Art

In business communication, it has been common for a business to operate a telephony private branch exchange (PBX) or other telephony control system to manage call routing and switching for their organization. Recently, services that provide similar and in some cases enhanced features or capabilities and which use different underlying technologies such as hosted or cloud PBX and unified communications platform (UC) which may also be hosted or cloud service, have entered the market and are now in general use as alternatives to traditional PBX Generally, PBX, and hosted or cloud PBX or UC service providers offer a variety of features and capabilities with their product, and an organization selects the subscription service that best suits their needs and configures the specific features they intend to use most. Currently, when a new feature or alternate configuration is needed, someone must manually reconfigure operation to prevent gaps in service—for example, setting a call-forwarding rule to "active" when they leave the office. Additionally, employees are increasingly becoming more mobile, working from a mobile phone instead of a desk phone, which requires more flexible behavior handling to accommodate frequent changes in location or availability. Subscribers using these telephony control systems now have complex features and functions available to them that span, a physical desk phone, a computer based softphone, a tablet based softphone, a mobile phone and a mobile based softphone, all at their disposal, depending on their location and context. The convergence of services onto these devices, whether personally or business owned, means increased complexity and a blurring of subscribers' business and personal time.

What is needed is a system for intelligent telephony system profile control that enables adaptive PBX, hosted or cloud PBX or hosted or cloud UC behavior with existing products, while enabling profile and persona management from a mobile device, thus allowing telephony control systems to adapt to subscribers and to improve their operation without necessarily requiring explicit user intervention.

SUMMARY OF THE INVENTION

Accordingly, the inventor has conceived and reduced to practice, in a preferred embodiment of the invention, a system and methods for intelligent call system profile and persona control, that integrates with mobile devices to automatically, in real time and near real time, intelligently modify configuration of the telephony control system based on subscriber context and actions.

According to a preferred embodiment of the invention, a system for intelligent call system profile and persona control, comprising a profile and persona management server comprising at least a plurality of programming instructions stored in a memory and operating on a processor of a network-connected mobile computing device and configured to receive at least a plurality of device event information from a user device, and configured to compare at least a portion of the event information to a plurality of feature bundles, the feature bundles each corresponding to at least a plurality of feature configurations, and configured to direct the operation of a telephony control system communicating via a network based at least in part on the feature configurations; and a database comprising at least a plurality of programming instructions stored in a memory and operating on a processor of a network-connected computing device and configured to store and provide at least a plurality of feature configurations and a plurality of corresponding feature bundles, wherein each feature bundle corresponds to at least subset of the stored feature configurations, is disclosed.

According to another preferred embodiment of the invention, a method for dynamic profile and persona management, comprising the steps of receiving, at a profile and persona management server comprising at least a plurality of programming instructions stored in a memory and operating on a processor of a network-connected computing device and configured to receive at least a plurality of device event information from a user device, and configured to compare at least a portion of the event information to a plurality of feature bundles, the feature bundles each corresponding to at least a plurality of feature configurations, and configured to direct the operation of a telephony control system communicating via a network based at least in part on the feature configurations, a plurality of device event information; comparing at least a portion of the event information to at least a plurality of feature bundles stored in a database comprising at least a plurality of programming instructions stored in a memory and operating on a processor of a network-connected computing device and configured to store and provide at least a plurality of feature configurations and a plurality of corresponding feature bundles; if a feature bundle that matches the portion of the event information is found, receiving a plurality of feature configuration information based at least in part on the feature bundle; and directing the operation of a telephony control system based at least in part on at least a portion of the feature configuration information, is disclosed.

According to a preferred embodiment, a dynamic profile and persona management system may be integrated with an existing telephony system, and may be used to automatically control existing rules and policies as well as add a layer of adaptive behavior to further enhance function. Continuous input from mobile devices may be used to drive feature configuration and rule activation in real-time, in response to changes in device state such as location, physical orientation, date and time, proximity or connectivity (for example, forwarding calls to a VoIP number if the device is on a WiFi network, or forwarding to another contact or a message recorder if a device goes out of the coverage area). Configuration may also be updated in response to user scheduling (for example, accessing a calendar or to-do list on a user's mobile device and using this information to change rules when the user is known to be unavailable). Rules may also be configured intelligently, preventing feature conflicts or errors in configuration that may occur when changes are made manually, as well as speeding up deployment of new configuration by directly modifying rules and behavior without requiring navigation of a configuration interface (as would be needed when manually configuring settings).

Operation may be configured by individual users (for example, to configure privacy settings or to input specific contact details for use), or by an organization for large-scale deployment without consistent configuration across a user base. Operation may be always on, using mobile features such as geofencing to detect changes and react accordingly without user interaction and without needing to keep a particular software application running on their device (which may negatively impact user experience, for example draining battery). Exemplary uses for always-on profile and persona management may include automatically forwarding calls when a user leaves an office or other location, send calls to voicemail during sleeping hours, mute or forward calls during scheduled events such as meetings, forward calls to personal assistant when the physical orientation of the device changes, like flipping the device down on a table, selectively muting certain contacts or call types while allowing others to ring, or configuring emergency contact settings.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
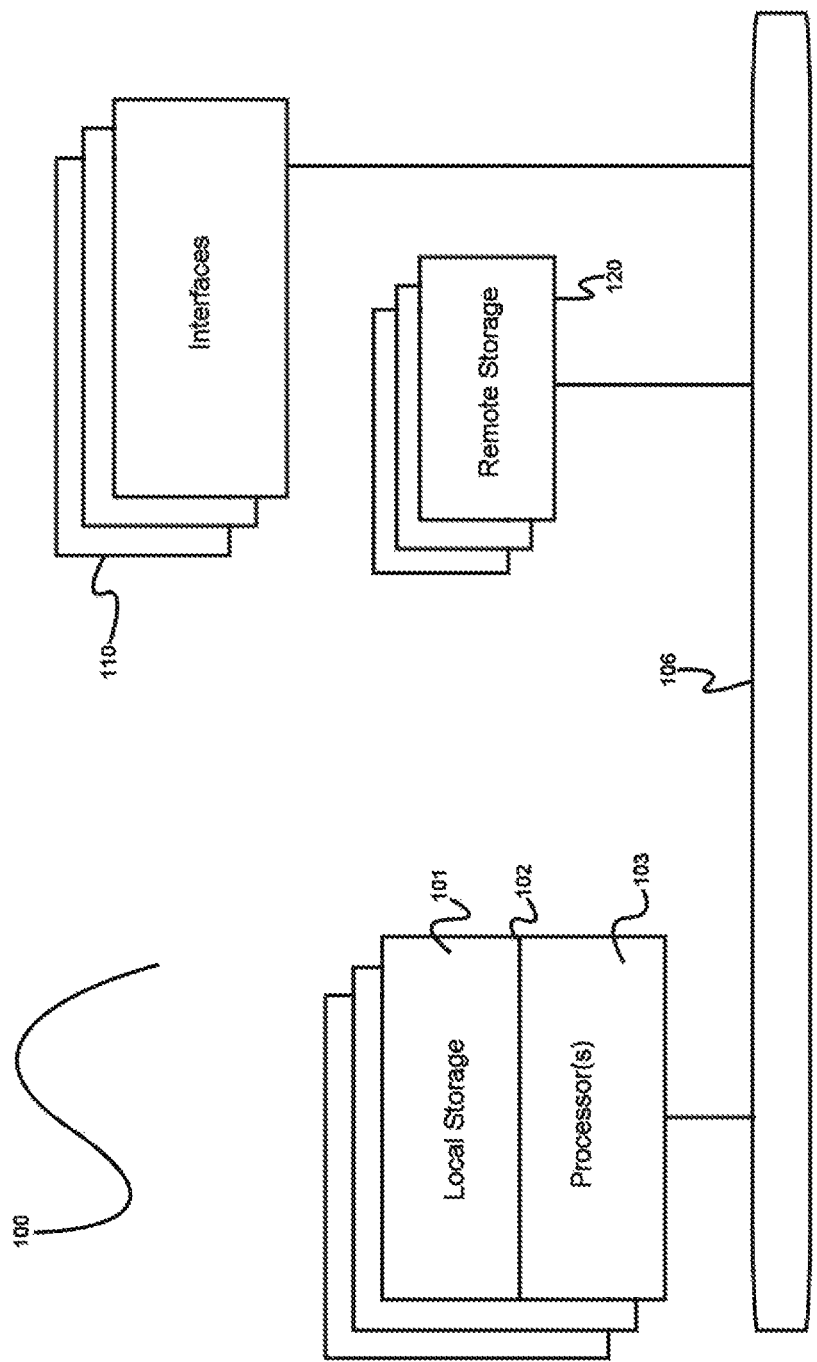
FIG. 1 is a block diagram illustrating an exemplary hardware architecture of a computing device used in an embodiment of the invention.

The inventor has conceived, and reduced to practice, in a preferred embodiment of the invention, a system and methods for dynamic profile and persona management, that integrates with mobile devices to intelligently modify operation and allows manual configuration through a mobile software application.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, wearable device, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device, smartphone, or smart watch running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
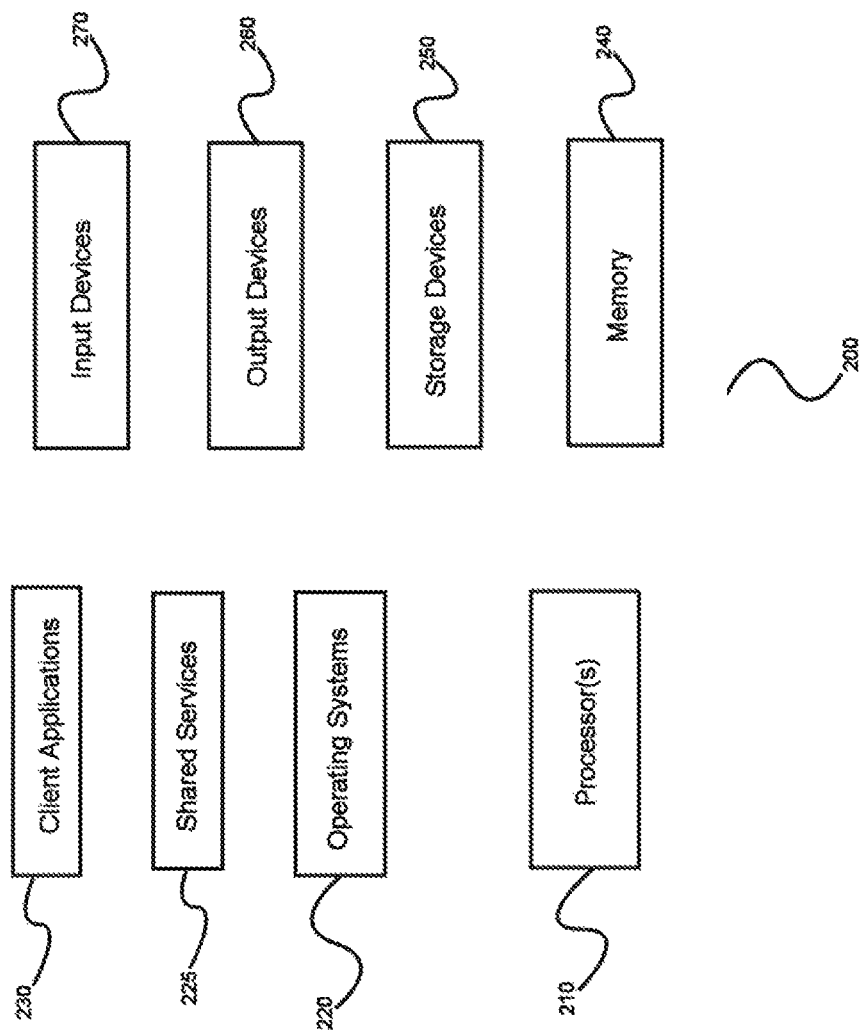
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

In some embodiments, systems of the present invention may be implemented on a distributed computing network, such as one having any number of clients and/or servers.

Figure 3:
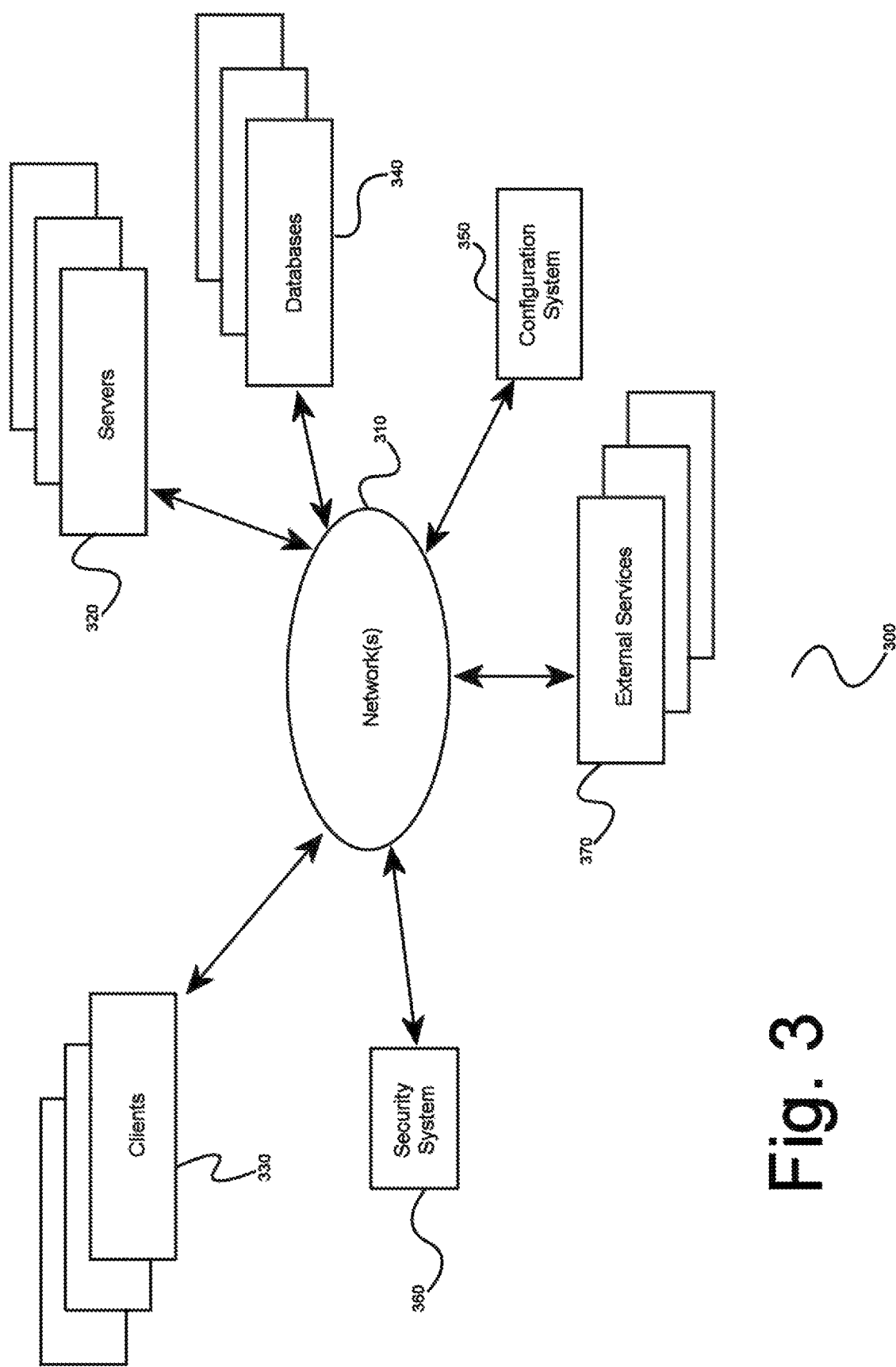
FIG. 3 is a block diagram showing an exemplary architectural arrangement of clients, servers, and external services, according to an embodiment of the invention.

Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone, smart watch, or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
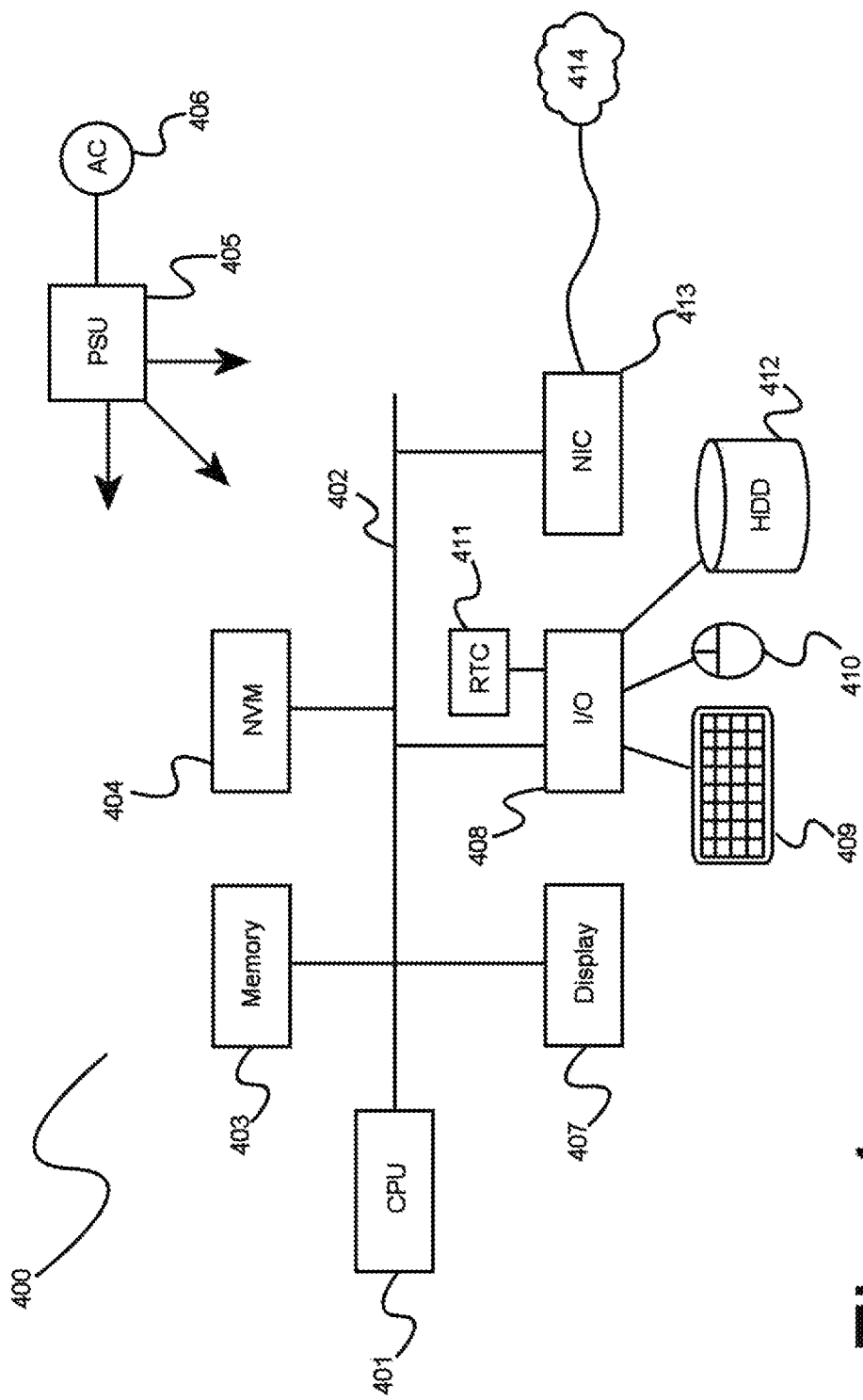
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. Central processor unit (CPU) 401 is connected to bus 402, to which bus is also connected memory 403, nonvolatile memory 404, display 407, input/output (I/O) unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to a main alternating current (AC) supply 406. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
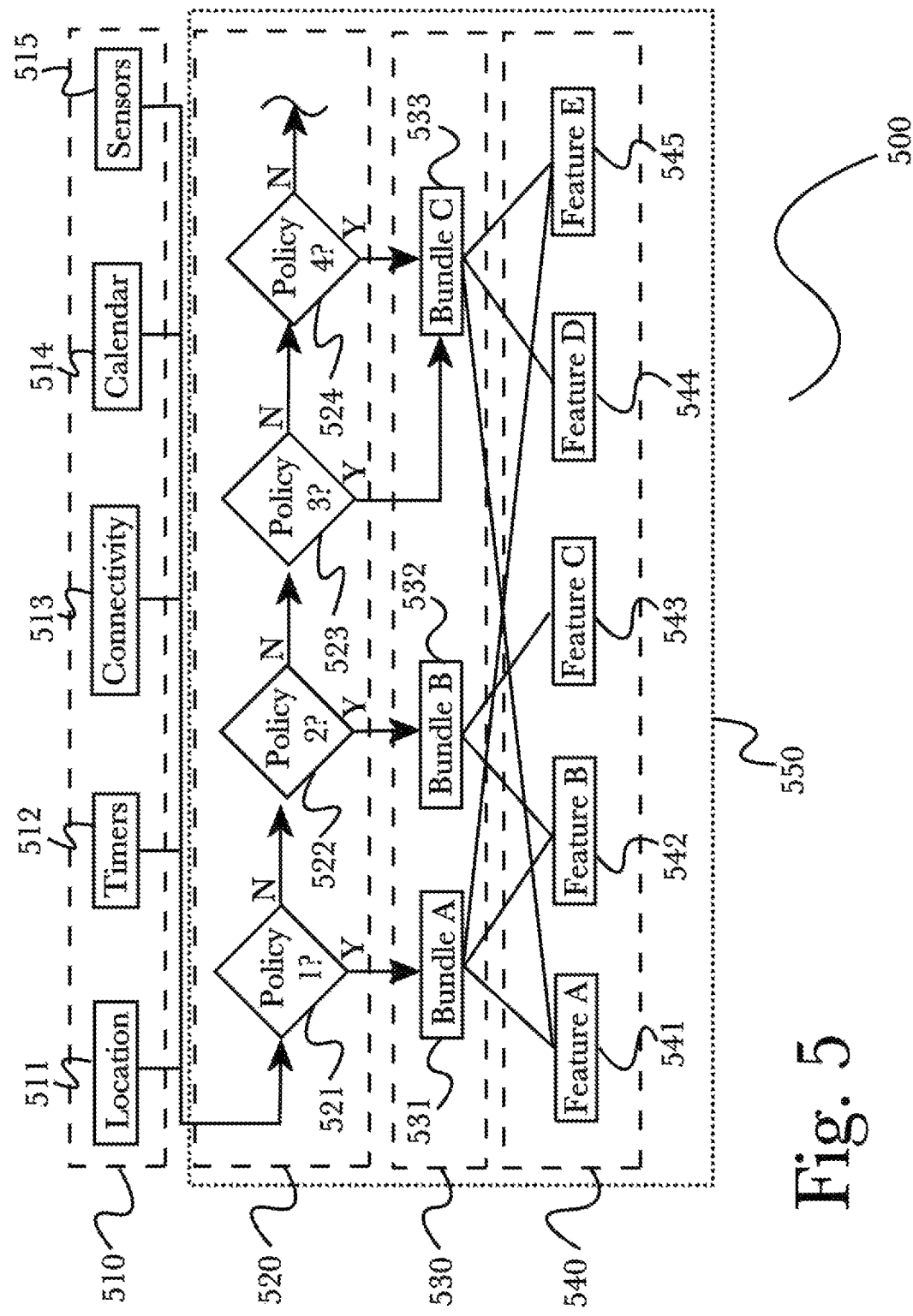
FIG. 5 is an overview of an exemplary system architecture for a profile and persona management server, according to a preferred embodiment of the invention.

FIG. 5 is an overview of an exemplary system architecture 500 for a profile and persona management server 550, according to a preferred embodiment of the invention. According to the embodiment, profile and persona management server 550 may operate on a user's mobile device (such as a smartphone), and may be integrated with a number of mobile systems 510 operating on a user's device, such as location sensors 511 (for example, a smartphone using GPS or network signal triangulation or Bluetooth beacons), clocks or timers 512, network connectivity information 513, calendar or other scheduling information 514, or hardware sensors 515 such as accelerometer or barometer devices that may be operating on a user's device. Mobile systems 510 may provide a variety of information that may be received and utilized by profile and persona management server 550 according to the embodiment as described below, and it should be appreciated that the quantity and type of information provided by mobile system 510 may vary. For example, additional sensor 515 types may be utilized if they are available, such as heart rate, light, pressure, vibration, electrical current, EM radiation, or other sensor types.

Data received from various sources may then be compared to configured behavior policies 520, and when a policy match is found, rules bundle 530 corresponding to a selected policy (for example, a set of rules and configurations that drive behavior according to the particular policy, such as forwarding specific types of calls to a specific contact number based on device location data) may be executed. Received data may be compared against configured policies according to an ordered list, checking against a first policy 521 to determine if the information is an appropriate match for the policy, and if not continuing on to additional policies 522-524, until a match is found or all known policies have been examined and no matches found. If a policy match is found, for example a fourth policy 524, a corresponding bundle 533 may be retrieved for execution. Various bundles 531, 532, 533 may correspond to particular sets of features 540, for example a bundle 531 comprising three features 541, 542, 545, or a second bundle comprising the same or a different set of features 542, 543. It should be appreciated that bundles may overlap and comprise similar or related features, for example as shown with bundle C 533, comprising features 541, 544, 545 that partially overlap with the features of bundle A 531. Features may comprise a variety of functions, rules, configuration parameters, or other operation instructions or values that may optionally be provided as bundled "recipes" to be used to direct the operation of the profile and persona management server 550 for profile and persona management behavior. Recipes may comprise any variety or combination of feature types, and may be created or modified by users or may simply be retrieved from a source such as an application store, and may be used "as-is" without further configuration. In this manner, providers may produce various feature recipes and publish them to make different feature types or combinations easily available to users with minimal configuration or technical knowledge required.

According to a preferred embodiment, profile and persona management server 550 may interact with an existing telephony control system (that is, a telephony control system currently deployed or in use may be directed by profile and persona management server 550, rather than requiring the setup of new hardware or reconfiguration of a telephony control system to facilitate integration) and may be used to automatically control existing rules and policies as well as add a layer of adaptive behavior to further enhance function. Continuous input from mobile devices may be used to drive feature configuration and rule activation in real-time, in response to changes in device state such as location 511, physical orientation, date and time, proximity and connectivity 513 (for example, forwarding calls to a VoIP number if the device is on a WiFi network, or forwarding to a contact or a message recorder if a device goes out of the coverage area). Configuration may also be updated in response to user scheduling (for example, accessing a calendar or to-do list 514 on a user's mobile device and using this information to change rules when the user is known to be unavailable). Rules may also be configured intelligently, preventing feature conflicts or errors in configuration that may occur when changes are made manually, as well as speeding up deployment of new configuration by directly modifying rules and behavior without requiring navigation of a configuration interface (as would be needed when manually configuring settings).

Operation may be configured by individual users (for example, to configure privacy settings or to input specific contact details for use, described below referring to FIG. 9), or by an organization for large-scale deployment with consistent configuration across a user base. Operation may be "always-on", using mobile features such as geofencing to detect changes and react accordingly without user interaction and without needing to keep a particular software application running on their device (which may negatively impact user experience, for example draining battery). Exemplary uses for always-on profile and persona management may include automatically forwarding calls when a user leaves an office or other location, send calls to voicemail during sleeping hours based on a device clock or set timers 512, mute or forward calls during scheduled events such as meetings or when a user places their device facedown on a surface, forward calls to a local number when traveling internationally, selectively muting certain contacts or call types while allowing others to ring, or configuring emergency contact settings. Additional exemplary use cases are described below in greater detail, referring to FIG. 9.

Detailed Description of Exemplary Embodiments

Figure 6:
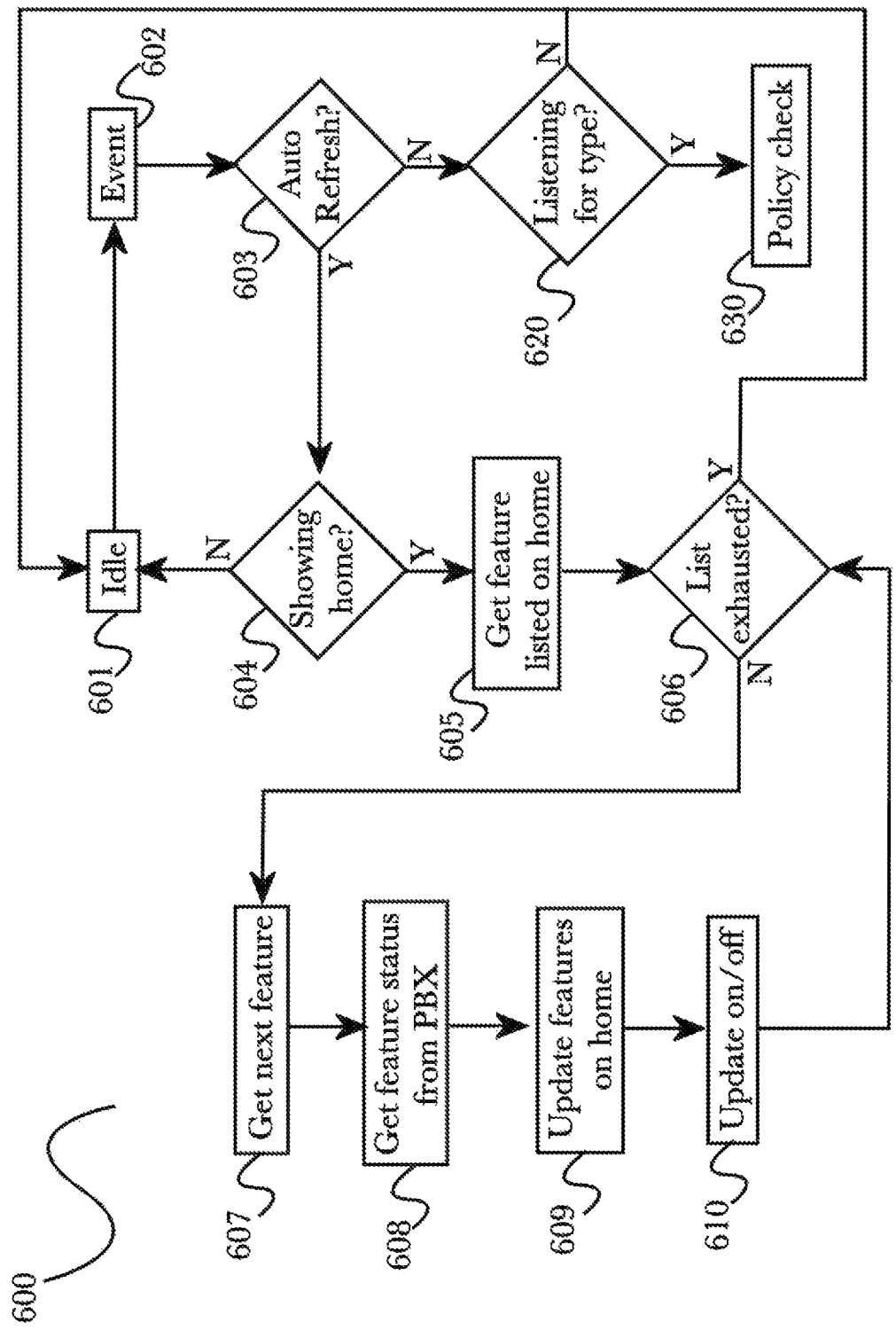
FIG. 6 is a flow diagram illustrating a process for profile and persona management event logic, according to a preferred embodiment of the invention.

FIG. 6 is a flow diagram illustrating a process 600 for profile and persona management event logic, according to a preferred embodiment of the invention. A profile and persona management server 550 may operate in an idle state 601, listening for incoming events such as device sensor readings or location updates. When an event is received 602, it may be checked to see if it is an automatic refresh event 603. If the event is a refresh event type, then the server may check to determine whether a home screen is being presented 604 (for example, via a management interface as shown in FIG. 9). If a home screen is not being shown, then no refresh may be needed and operation may conclude with the server returning to an idle state 601. It should be appreciated that this refers to the refresh and idle state of a screen being shown, and it may be possible for applications or resources to continue operating in the background while they are not shown on a screen (for example, for chat messaging applications that may continue listening for new messages and only present an on-screen indicator when a message is received). Moreover, an application according to the invention may run in the background on a mobile device while other applications are being used, such as email, word processing web browsing, and similar applications; in these situations, the application according to the invention may receive events such as phone orientation changes and react to them if a recipe is triggered by such an event. If a home screen is being shown, a feature list is retrieved 605 and iterated through 606 to retrieve the next feature in the list 607, retrieve that feature's current status from a telephony control system 608 (such as a PBX), update the presented feature list on the home screen 609, and then update whether the current feature's state is on or off 610. This iteration continues until the feature list is exhausted, at which point operation concludes and the server returns to an idle state 601 to await any further events, for example changes to a telephony control system configuration or to a user's device data (such as a change in location or connectivity, for example switching from a WiFi network to a cellular data network). If the event is not an automatic refresh event type, the event may be checked to see if it matches any event types the server is listening for 620. If the event received is of a type the application is currently listening for 620 (for example, according to a previously-configured feature), processing for events ends and the event may be used to check for an appropriate policy 630 as described below (referring to FIG. 8).

Figure 7:
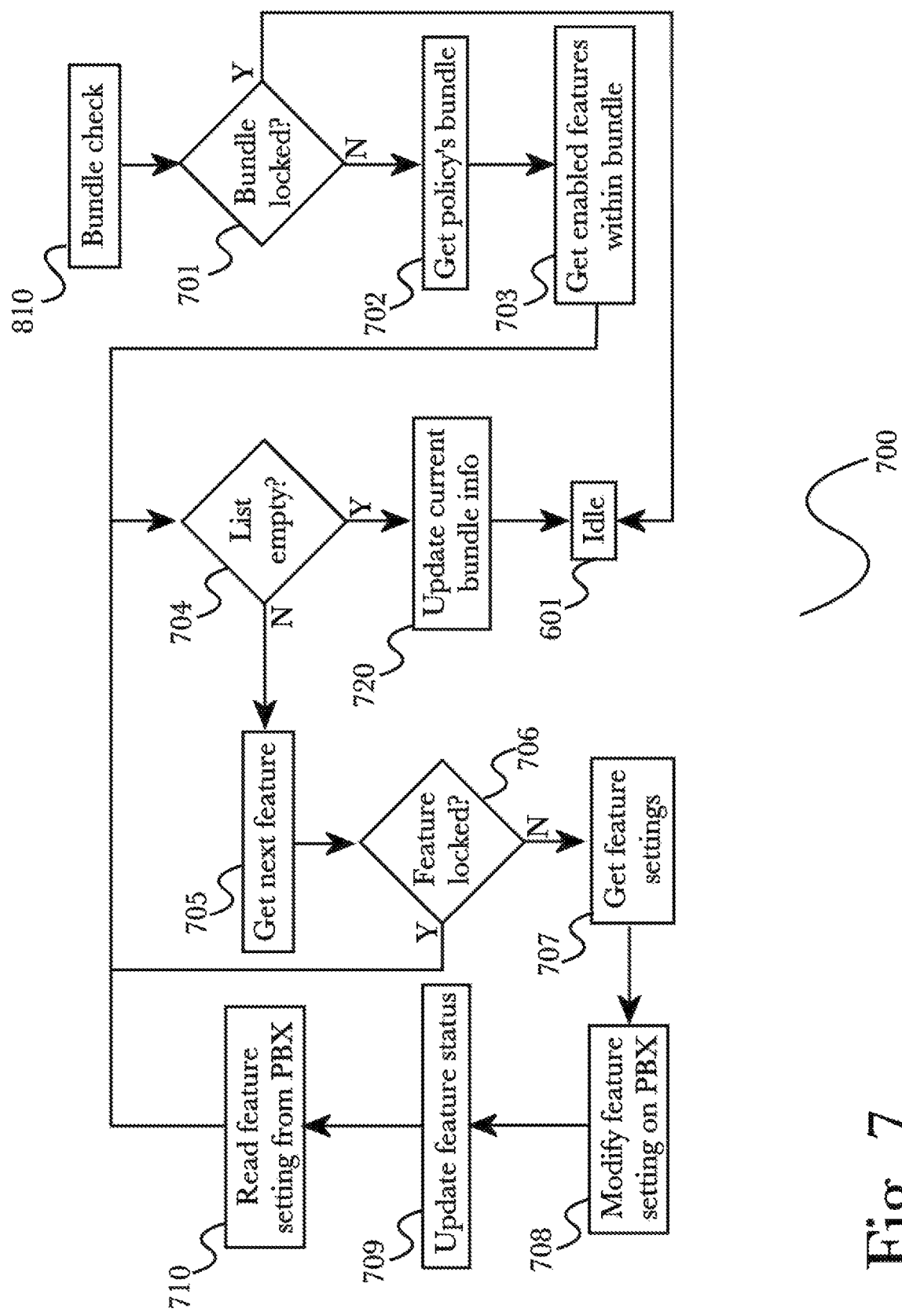
FIG. 7 is a flow diagram illustrating a process for profile and persona management bundle logic, according to a preferred embodiment of the invention.

FIG. 7 is a flow diagram illustrating a process 700 for profile and persona management bundle logic, according to a preferred embodiment of the invention. According to the embodiment, when a profile and persona management server 550 retrieves appropriate policy information, a bundle check may be performed to determine whether to execute a feature bundle, and if so, which one to select. Upon initiating a bundle check, server 550 may determine whether a bundle is "locked" in step 701, or blocked from execution (for example, features that have restricted access for certain users, or features that are not supported by a user's device or service subscription). If a bundle is locked, server 550 may return to an idle state 601 and resume listening for incoming events. If the bundle is not locked, the associated policy may be retrieved in step 702 and checked for bundle information, retrieving a list of features included in the bundle in step 703 and then iterating over the list in step 704 to read, update, or modify features as needed until the feature list is exhausted. In a first iteration step 705, the next feature in the bundle's feature list may be retrieved. The feature is then examined to determine if it is locked in step 706, and if so operation loops back to examine whether the list has been exhausted in step 704 before continuing. If the feature is not locked, its corresponding settings are retrieved in step 707, and these may be used to modify any corresponding setting in a telephony control system in step 708. Upon modifying telephony control system settings, the feature's status may be updated in step 709 in a feature list (to reflect the new changes), for example by reading the new feature settings from the telephony control system in step 710 after modification (to ensure that the appropriate values or other information are known and presented in a feature list, rather than relying on preconfigured values that may not accurately reflect the state of a PBX after an update). When a bundle's feature list is empty (that is, all features have been iterated upon or processed), the bundle information may be updated in an application display in step 720 (for example, so that a user may check what their current operation mode is, or currently-enabled features), and server 550 may return to an idle state 601 and resume listening for more events.

Figure 8:
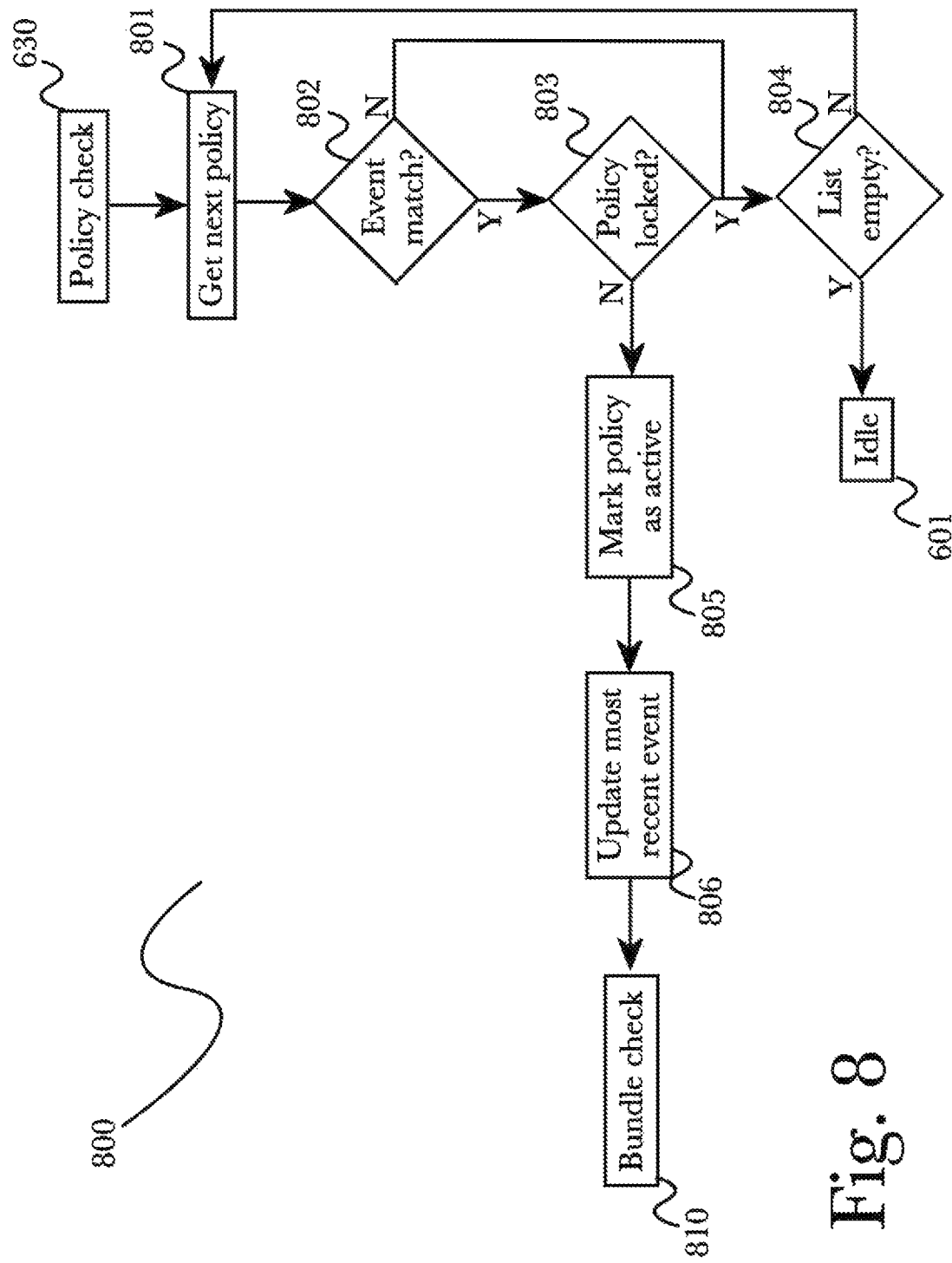
FIG. 8 is a flow diagram illustrating a process for profile and persona management policy logic, according to a preferred embodiment of the invention.
Figure 9:
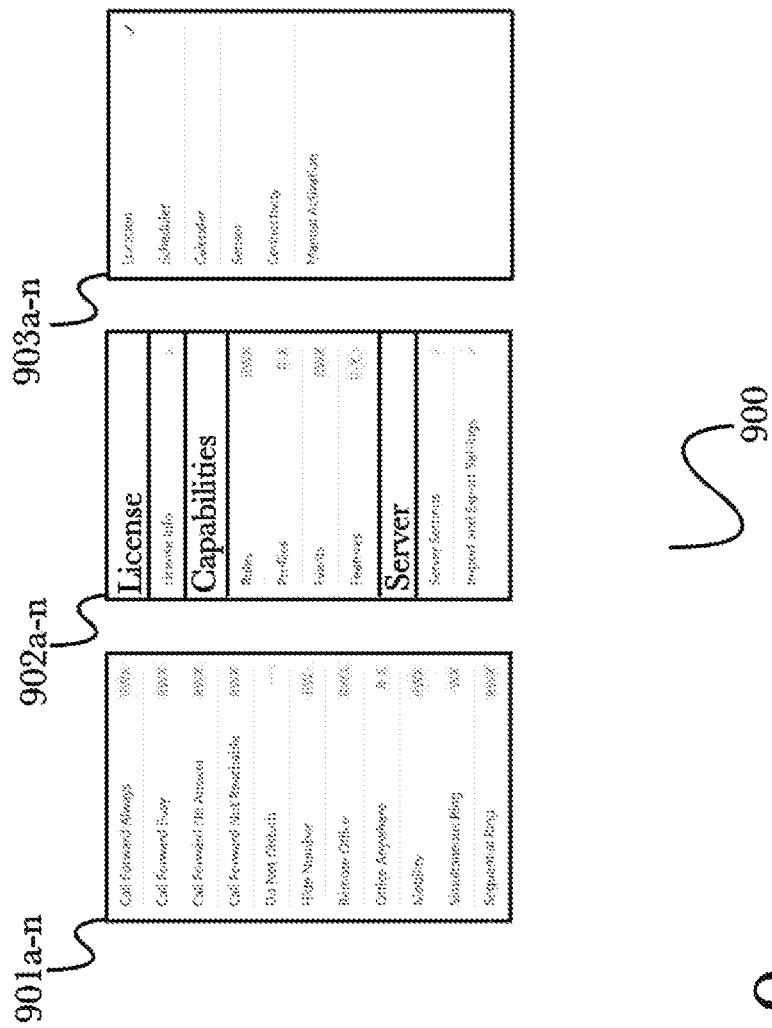
FIG. 9 is a diagram of an exemplary profile and persona management user interface operating on a mobile device.

FIG. 8 is a flow diagram illustrating a process 800 for profile and persona management policy logic, according to a preferred embodiment of the invention. When an application receives a qualifying event (that is, an event for which the application was listening while in an idle state), it may begin a policy check 630 to examine available policies and determine if any match the received event. A profile and persona management server 550 may retrieve the next known policy in step 801 for examination, and compare the received event information to see if it matches the policy requirements in step 802. If an event match is not found, the list is checked for any additional policies in step 804. If the list is exhausted, the server may return to an idle state 601, otherwise the next policy may be retrieved in step 801 and operation continues. If an event match is found, the policy is checked to see if it is locked in step 803, and if so operation continues with examining the list for additional policies in step 804. If the policy is not locked, it may be marked as active in step 805 and event information may be updated to reflect the policy change in step 806. The server may then check for feature bundles in step 810 according to the activated policy, as described in FIG. 7.

FIG. 9 is a diagram of an exemplary profile and persona management interface 900 operating on a mobile device. A user may view a list of available features and capabilities 901a-n optionally displayed with particular permissions such as read, write, or execute, referring to their ability to modify those features (for example, a user may be permitted to modify call forwarding settings but not their network access point name), and specific features may be presented in a sorted or grouped listing 902a-n according to such configuration as telephony control system capabilities, user access privileges, specific device capabilities, or server-based rules and settings. Users may configure various aspects of operation 903a-n such as preferences for location or schedule behavior, enabling a manual fine-tuning of their specific operation and capabilities.

For example, a user may choose to enable location and hardware sensor readings such as from an accelerometer or gyroscope operating on their device, and may configure rules to modify behavior based on physical orientation or movement of their device so they may modify profile and persona management settings through manipulation of the device. A particular example of this may be for a user to configure their device to automatically mute all incoming calls and forward to another number (such as their voicemail, for example) when they place the device face down on a surface, such as turning their phone over on a conference table during a meeting. Another example may be a user configuring operation such that placing their device in a pocket or bag will automatically update their availability status (for example, using a device's "do not disturb" settings or by setting call forwarding or calendar status) to indicate that they are "away", or unavailable. Another example may be configuration so that anytime a user is on a roaming network, their calls may be unconditionally forwarded to another phone number, such as one on a non-roaming carrier, to avoid unnecessary charges or plan usage. Another example may be a user configuring operation such that passing by a beacon (e.g Bluetooth beacon) within a specified range will automatically update their availability status (for example, instigating a feature bundle change to forward calls to a personal assistant as the user passes by the entrance to a meeting room, where the beacon is situated.

Another example may be a user configuring operation such that placing the user's device within a certain distance (immediate, near, far) (e.g Bluetooth beacon located on a telephone system handset (fixed phone) in a home office study) will automatically update different availability or feature bundle (for example, instigating a feature bundle change to the mobile persona to 'personal' when the user's device moves into the 'far' range within a home office environment, or changes the feature bundle to the mobile persona of 'work mode' when the user's device moves into the 'near' range, signifying the user has moved into their home office or when the user's device moves into the 'immediate' range, while they are talking on the device (placing the device within a few centimeters of the beacon), the feature bundle instigates an automatic 'move' of the telephone call to the telephone system handset.

The skilled person will be aware of a range of possible modifications of the various embodiments described above. Accordingly, the present invention is defined by the claims and their equivalents.

What is claimed is:

1. A system for automated telephony control system feature management, comprising:
   a feature configuration database comprising a plurality of pre-defined telephony control system feature configurations; and a telephony control system feature manager comprising at least a plurality of programming instructions stored in a memory and operating on a processor of a telephony control system and configured to:

receive device event information from a user device associated with the telephony control system;

automatically create a feature configuration for the user device based on the device event information or select a pre-defined feature configuration for the user device from the feature configuration database based on the device event information; and direct the operation of the telephony control system by activating, modifying, or deactivating one or more features of the telephony control system based on the created or selected feature configuration.

2. The system of claim 1, wherein one or more of the feature configurations is contained in a feature bundle.

3. The system of claim 1, wherein the creation or selection of a feature configuration is influenced by one or more feature policies.

4. A method automated telephony control system feature management, comprising the steps of:

receiving the device event information from a user device associated with a telephony control system at a telephony control system feature manager comprising at least a plurality of programming instructions stored in a memory and operating on a processor of the telephony control system;

automatically creating feature configuration for the user device based on the device event information or selecting a pre-defined feature configuration for the user device from a feature configuration database based on the device event information; and directing the operation of the telephony control system by activating, modifying, or deactivating one or more features of the telephony control system on the created or selected feature configuration.

5. The method of claim 4, wherein one or more of the feature configurations is contained in a feature bundle.

6. The method of claim 5, further comprising the step of influencing the creation or selection of a feature configuration using one or more feature policies.

* * * * *